United States Patent Office.

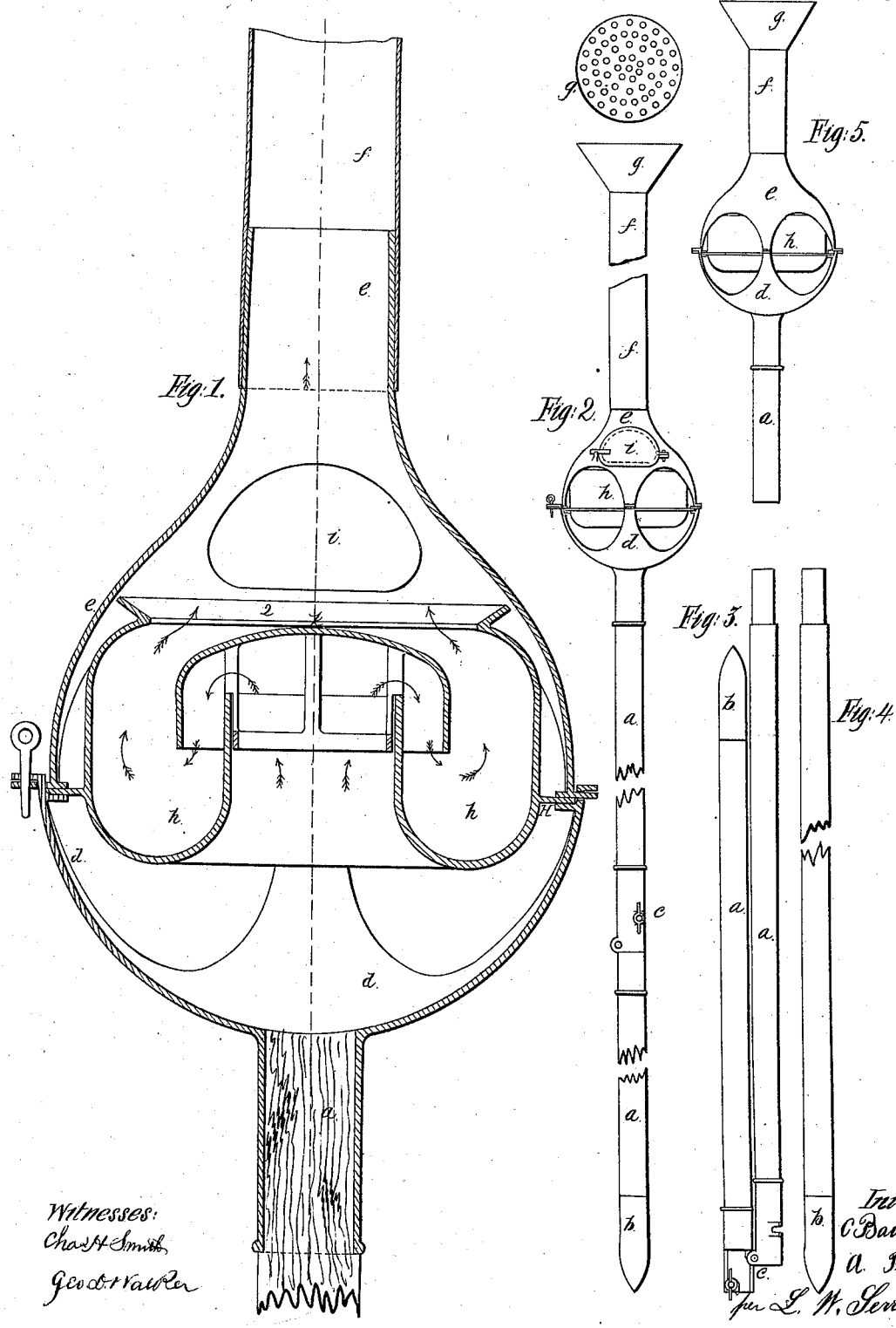

CONSTANT BAUDOUIN AND ALPHONSE FTELEY, OF NEW YORK, N. Y.

Letters Patent No. 87,324, dated March 2, 1869.

IMPROVEMENT IN APPARATUS FOR DESTROYING INSECTS ON TREES.

The Schedule referred to in these Letters Patent and making part of the same.

To all whom it may concern:

Be it known that we, CONSTANT BAUDOUIN and ALPHONSE FTELEY, of the city and State of New York, have invented and made a new and useful Apparatus for Destroying Caterpillars and Insects upon Trees, &c.; and we do hereby declare the following to be a full, clear, and exact description of the said invention, reference being had to the annexed drawing, making part of this specification, wherein—

Figure 1 is a vertical section of the fumigating-apparatus in about the usual size;

Figure 2 is an elevation representing the same upon a pole;

Figures 3 and 4 represent the poles disconnected or folded; and

Figure 5 is an elevation of apparatus upon the opposite side to that in fig. 2.

Similar marks of reference denote the same parts.

This invention is designed for effecting the fumigation of vegetation, to effect the destruction of caterpillars, worms, insects, eggs, chrysalides, beetles, and other animal life that is or may become destructive to vegetation. The apparatus is intended to effect this object by fumigation alone, or by fumigation and heat jointly.

We herein employ the words "fumigation" and "caterpillars" to express the general operation and the animal life to be destroyed.

In the drawing—

$a$ represents a handle, rod, or pole, upon which the apparatus is to be placed for the convenience of directing it.

This may be a single length, as in fig. 5, or provided with a spike-end, $b$, to thrust in the ground, as in fig. 4, or the two or more lengths may be hinged together, as at $c$, figs. 2 and 3, the ends of the poles going into sleeves or sockets.

By this means any desired length of handle can be obtained.

The fumigating-apparatus is made of an open receiver or frame, $d$, and an inverted funnel or fumigator-pipe, $e$.

The frame $d$ is to set, by a socket, on the end of the pole $a$; and the parts $d$ and $e$ are united by a hinge and pin, or bayonet-lock, or similar device, so that they can be easily separated; and the movable pipe $f$ may be of any desired length to suit the convenience in directing the fumes to the desired spot.

At the upper end of the apparatus, a rose, or perforated head, $g$, may be employed to divide the fumes.

Within the parts $d\ e$, is a vessel, $h$, to hold the sulphur, tobacco, or other substance to be burned.

We have shown, and prefer that this vessel $h$ be made as a deep hollow ring, (see fig. 1,) with a contracted upper edge, 2, to prevent the contents spilling when inclined; and a cap, $k$, over the opening in the vessel $h$, directs the air upon the burning mass, to promote combustion, this downward draught being important, especially with sulphur, to insure its combustion.

The pipe $f$ forms a tube, to increase the draught, and the door $i$ is provided so as to charge the vessel $h$ conveniently with the sulphur or other material to be burnt.

This apparatus gives opportunity to direct the fumes and heated gases upon caterpillars, and rapidly destroy them, and the heat can be regulated by the length of the pipe $f$.

This pipe also acts as a chimney, and the cap $k$ forms a deflector to cause the air to impinge upon the surface of the material being burnt.

What we claim, and desire to secure by Letters Patent, is—

1. The fumigating-apparatus, formed of the vessel $h$, frame $d$, funnel $e$, and pipe $f$, substantially as set forth.

2. The vessel $h$, formed with the overhanging sides 2, and the cap $k$, as and for the purposes set forth.

3. The fumigator, provided with a vessel to contain the material to be burnt, and a deflector for directing a current of air down upon the same, to insure proper combustion, as specified.

In witness whereof, we have hereunto set our signatures, this 22d day of January, 1869.

C. BAUDOUIN.
A. FTELEY.

Witnesses:
CHAS. H. SMITH,
GEO. T. PINCKNEY.